(12) United States Patent
Kasahara

(10) Patent No.: US 9,873,175 B2
(45) Date of Patent: Jan. 23, 2018

(54) INTERFERENCE DETERMINATION METHOD AND INTERFERENCE DETERMINATION DEVICE FOR MACHINE TOOL

(75) Inventor: Tadashi Kasahara, Aiko-gun (JP)

(73) Assignee: MAKINO MILLING MACHINE CO,. LTD., Tokyo (JP)

( * ) Notice: Subject to any disclaimer, the term of this patent is extended or adjusted under 35 U.S.C. 154(b) by 568 days.

(21) Appl. No.: 14/395,011

(22) PCT Filed: Apr. 17, 2012

(86) PCT No.: PCT/JP2012/060360
§ 371 (c)(1),
(2), (4) Date: Oct. 16, 2014

(87) PCT Pub. No.: WO2013/157081
PCT Pub. Date: Oct. 24, 2013

(65) Prior Publication Data
US 2015/0068272 A1 Mar. 12, 2015

(51) Int. Cl.
*B23Q 17/22* (2006.01)
*G05B 19/4061* (2006.01)
(Continued)

(52) U.S. Cl.
CPC ......... *B23Q 17/2208* (2013.01); *B23Q 15/00* (2013.01); *G01B 21/042* (2013.01);
(Continued)

(58) Field of Classification Search
CPC ............ G05B 19/4061; G05B 19/4069; G05B 19/4093; G05B 2219/35316;
(Continued)

(56) References Cited

U.S. PATENT DOCUMENTS 7,251,543 B2 * 7/2007 Nakamura ......... G05B 19/4069
700/159
7,412,296 B2 * 8/2008 Yamaguchi ...... G05B 19/40937
700/160
(Continued)

FOREIGN PATENT DOCUMENTS

EP 2058717 A1 5/2009
JP 3-63761 9/1984
(Continued)

OTHER PUBLICATIONS

International Search Report dated Jul. 17, 2012, directed towards International Aplication No. PCT/JP2012/060360; 2 pages.

*Primary Examiner* — Crystal J Barnes-Bullock
(74) *Attorney, Agent, or Firm* — Morrison & Foerster LLP

(57) ABSTRACT

An interference determination method for machine tools which determines whether or not there will be interference between elements that move relative to each other, the method including: a setting procedure for setting a machine tool model obtained by combining the shape model of each of the elements including a work model corresponding to the work; a measurement procedure for measuring the position of the work attached to the work attachment part; a correction procedure for acquiring, at a predetermined timing, the position of the work measured in the measurement procedure, and correcting the machine tool model set in the setting procedure; and a determination procedure for determining whether or not there will be interference between the elements on the basis of the machine tool model corrected in the correction procedure.

5 Claims, 6 Drawing Sheets

(51) Int. Cl.
*B23Q 15/00* (2006.01)
*G01B 21/04* (2006.01)

(52) U.S. Cl.
CPC .............. *G05B 19/4061* (2013.01); *G05B 2219/33301* (2013.01); *G05B 2219/35304* (2013.01); *G05B 2219/35308* (2013.01); *G05B 2219/35316* (2013.01); *G05B 2219/49123* (2013.01); *G05B 2219/50062* (2013.01)

(58) Field of Classification Search
CPC ......... G05B 2219/49143; G05B 2219/491577; G06T 2210/21; B25J 9/1676; B23Q 17/24
See application file for complete search history.

(56) References Cited

U.S. PATENT DOCUMENTS

| | | | |
|---|---|---|---|
| 8,326,448 | B2 | 12/2012 | Schneider |
| 9,530,246 | B2 * | 12/2016 | Miyata .................. B25J 9/1676 |
| 2008/0103741 | A1 | 5/2008 | Fukaya et al. |
| 2013/0030758 | A1 * | 1/2013 | Suzuki .................. B23Q 17/24 |
| | | | 702/167 |

FOREIGN PATENT DOCUMENTS

| | | | |
|---|---|---|---|
| JP | 03103902 A | * | 4/1991 |
| JP | 4-340605 | | 11/1992 |
| JP | 6-161534 | | 6/1994 |
| JP | 10-161720 | | 6/1998 |
| WO | WO-2010/073294 | | 7/2010 |

* cited by examiner

INTERFERENCE DETERMINATION METHOD AND INTERFERENCE DETERMINATION DEVICE FOR MACHINE TOOL

CROSS REFERENCE TO RELATED APPLICATIONS

This application is a U.S. National Phase patent application of PCT/JP2012/060360, filed on Apr. 17, 2012, which is hereby incorporated by reference in the present disclosure in its entirety.

FIELD OF THE INVENTION

The present invention relates to an interference judgment method and an interference judgment system of a machine tool for judging a presence or absence of an interference between components.

BACKGROUND OF THE INVENTION

In the past, there has been known a system which uses shapes and dimensions (models) and movement data (machining program) of members which move relative to each other at a tool side and a workpiece side of a machine tool to check for an interference between the members when the machine tool is operated (for example, see Patent Literature 1). In the system described in Patent Literature 1, when storing a workpiece model in a memory, when the dimensions, position, and posture of a workpiece are input, it is assumed that a workpiece having the predetermined dimensions is mounted at a predetermined position of the machine tool.

However, workpieces which are mounted at a machine tool vary in dimensions, positions, and postures. In order to execute an accurate check for interference, it is necessary to measure the actually mounted workpieces for dimensions, positions, and postures and input these as modeling data. This took trouble and time. Further, the judgment of interference is poor in precision.

PATENT LITERATURE

Patent Literature 1: Japanese Patent Publication No. 3-63761B2

SUMMARY OF THE INVENTION

The present invention provides an interference judgment method of a machine tool for judging a presence or absence of an interference between components of a machine tool when operating the machine tool according to a machining program, including: a setting step of setting a machine tool model obtained by combining shape models of the components, the machine tool model including a workpiece model corresponding to a workpiece; a measurement step of measuring the workpiece mounted to a workpiece mounting part to determine a parameter relating to a workpiece coordinate system; a correcting step of reading the parameter relating to the workpiece coordinate system determined at the measurement step at a predetermined timing to correct the machine tool model set at the setting step; and a judgment step of judging the presence or absence of the interference between the components based on the machine tool model corrected at the correcting step.

Further, the present invention provides an interference judgment system of a machine tool for judging a presence or absence of an interference between components of a machine tool when operating the machine tool according to a machining program, including: a setting part setting a machine tool model obtained by combining shape models of the components, the machine tool model including a workpiece model corresponding to a workpiece; a correcting part reading a parameter relating to a workpiece coordinate system of the machine tool at a predetermined timing to correct the machine tool model set at the setting part; and a judgment part judging the presence or absence of the interference between the components based on the machine tool model corrected at the correcting part.

DESCRIPTION OF THE INVENTION

Figure 1:
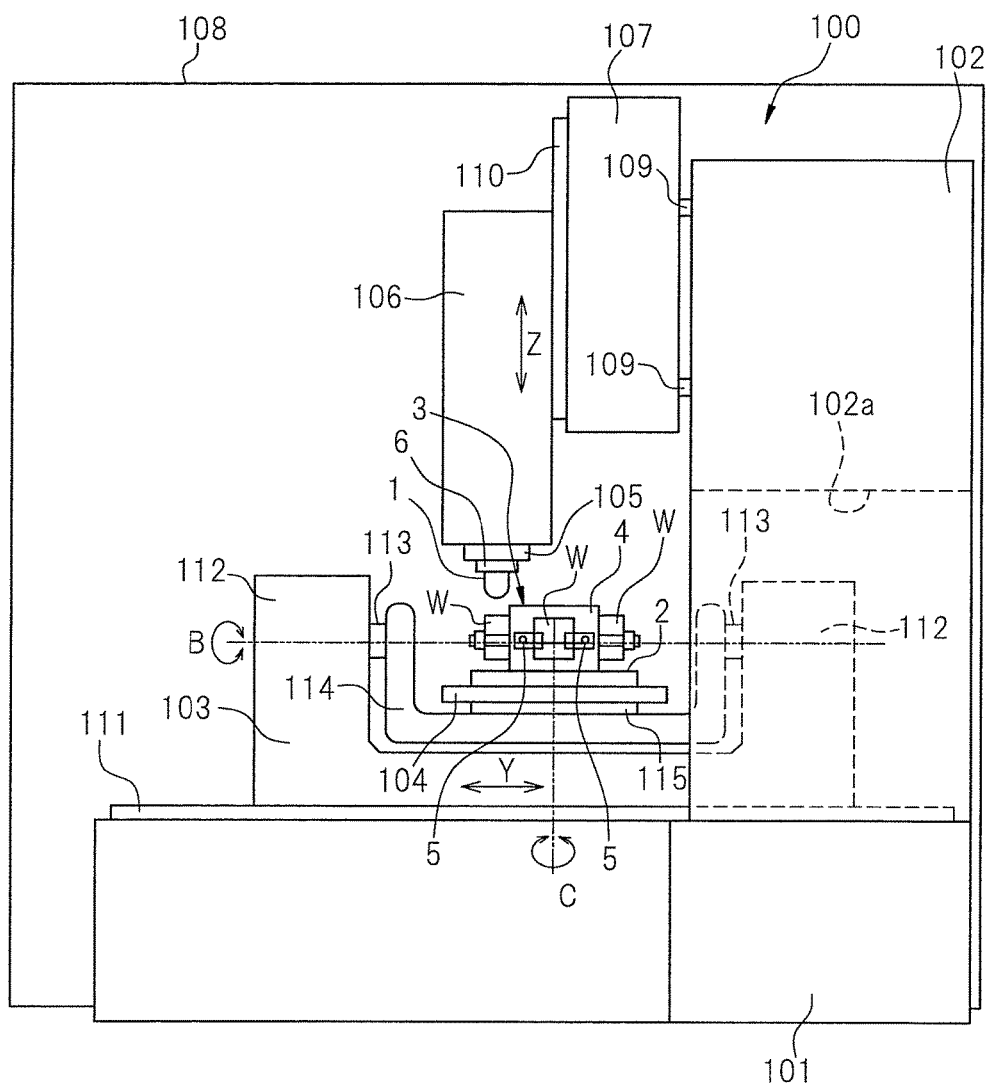
FIG. 1 is a front view which shows a general configuration of a machine tool to which the present invention is applied.

Below, referring to FIG. 1 to FIG. 6B, an embodiment of an interference judgment system of a machine tool according to the present invention will be explained. FIG. 1 is a front view which shows a general configuration of one example of a machine tool 100 to which the present invention is applied and constituted by a vertical machining center. This machine tool 100 is a five-axis machining center which has three perpendicular axes (X-axis, Y-axis, and Z-axis) and two rotational axes (B-axis and C-axis) as drive axes. Below, the X-axial direction (direction vertical to paper surface of FIG. 1), Y-axial direction (left-right direction of FIG. 1), and Z-axial direction (top-bottom direction of FIG. 1) are respectively defined as the "left-right direction", "front-back direction", and "top-bottom direction".

In FIG. 1, a column 102 is provided in a standing condition on the top surface of a bed 101 as a base. On the top surface of the bed 101, a carriage 103 is carried. In front of the column 102 and above the carriage 103, a rotary table 104 is arranged. Above the rotary table 104, a spindle head 106 is arranged. The spindle head 106 rotatably supports a spindle 105 centered about an axial line in the vertical direction. At the front end of the spindle 105, an end mill or other tool 1 is attached through a tool holder 6. The spindle head 106 is supported by a saddle 107 at the front surface of the column 102. The machine tool 100 is surrounded by a cover 108 in its general entirety.

The column 102 has a pair of leg parts which are separated from each other in the left-right direction and thereby forms a cavity part 102a. At the front surface of the column 102, a pair of top and bottom rails 109 are laid in the left-right direction. The saddle 107 is supported at the column 102 movably along the rails 109 in the left-right direction. At the front surface of the saddle 107, a pair of left and right rails 110 are laid in the top-bottom direction. The spindle head 106 is supported at the saddle 107 movably along the rails 110 in the top-bottom direction. At the top surface of the bed 101, a pair of left and right rails 111 are laid in the front-back direction. The carriage 103 is guided and supported by the bed 101 movably along the rails 111 in the front-back direction. Part of the carriage 103 can enter into the cavity part 102a of the column 102.

The carriage 103 has a pair of support columns 112 which are separated from each other in the front-back direction and is therefore formed into a substantially U-shape. At the support columns 112, swing shafts 113 are provided sticking out facing each other on a line parallel to the Y-axis. The swing shafts 113 are supported rotatably about the support columns 112. At the front ends of the swing shafts 113, a swing support member 114 which is formed into a substantially U-shape is supported swingably in the B-axial direction. At the top surface of the swing support member 114, a rotary table 104 is fastened rotatably in the C-axial direction through a rotational shaft 115. At the top surface of the rotary table 104, a pallet 2 is carried. On the top surface of the pallet 2, an angle plate 3 is supported. The angle plate 3 is a four-sided angle plate which exhibits a rectangular parallelepiped shape. Workpiece mounting surfaces 4 are formed at the outside surfaces of the angle plate 3. At the workpiece mounting surfaces 4, workpieces W are mounted through workpiece mounts 5.

While the illustration is omitted, the machine tool 100 of FIG. 1 has an X-axis use drive part which makes the saddle 110 move along the rails 109 in the left-right direction, a Y-axis use drive part which makes the carriage 103 move along the rails 111 in the front-back direction, a Z-axis use drive part which makes the the spindle head 106 move along the rails 110 in the top-bottom direction, a B-axis use drive part which makes the swing support member 114 swing through the swing shafts 113, and a C-axis use drive part which makes the rotary table 104 rotate through the rotary shaft 115. The X-axis use drive part, Y-axis use drive part, and Z-axis use drive part are, for example, configured by ball screws and servo motors which drive rotation of the ball screws, while the B-axis use drive part and C-axis use drive part are, for example, configured by DD (direct drive) servo motors.

Due to the above configuration, the tool 1 can move relative to the workpiece W in the X-axial direction, Y-axial direction, and Z-axial direction and can move relative to it in the B-axial direction and C-axial direction. Therefore, it is possible to machine the workpiece W to a desired 3D shape. In particular, in the present embodiment, workpieces W are mounted to the four sides of the angle plate 3, so by making the rotary table 104 rotate 90 degrees in the C-axial direction, a plurality of workpieces W can be successively machined.

The above machine tool 100 has a plurality of components which move relative to each other (workpieces W, spindle head 106, swing support member 114, etc.) These components need to be configured so as not to interfere with each other during operation of the machine tool 100. Whether the components interfere with each other in their ranges of movement can be confirmed in advance by simulation using a computer. When performing a simulation, first, shape models of the plurality of components including the workpieces W are prepared, then these shape models are combined to prepare a machine tool model so that the shapes models are set to predetermined relative positional relationships corresponding to the machine tool 100. Next, the shape models are made to operate on the computer in accordance with the machining program and it is judged if there are any intersecting parts between the shape models. In this case, as the machine tool model, the simulation becomes easier if, rather than preparing a shape model of the machine tool as a whole, preparing only shape models of certain parts which are liable to interfere with each other when the machine tool 100 is operated.

In this regard, the position of a workpiece on the machine tool model, i.e., a calculated workpiece position does not necessarily always match an actual workpiece position. Sometimes a workpiece W is mounted deviated from the calculated workpiece position. Therefore, to perform the judgment of interference precisely, it is preferable to measure the actual workpiece position and use that workpiece position to prepare a machine tool model and perform a simulation. However, it is not easy to revise a machine tool model so as to match the actual workpiece position. Therefore, in the present embodiment, in order to precisely and efficiently judge interference, the interference judgment system is configured as follows.

Figure 2:
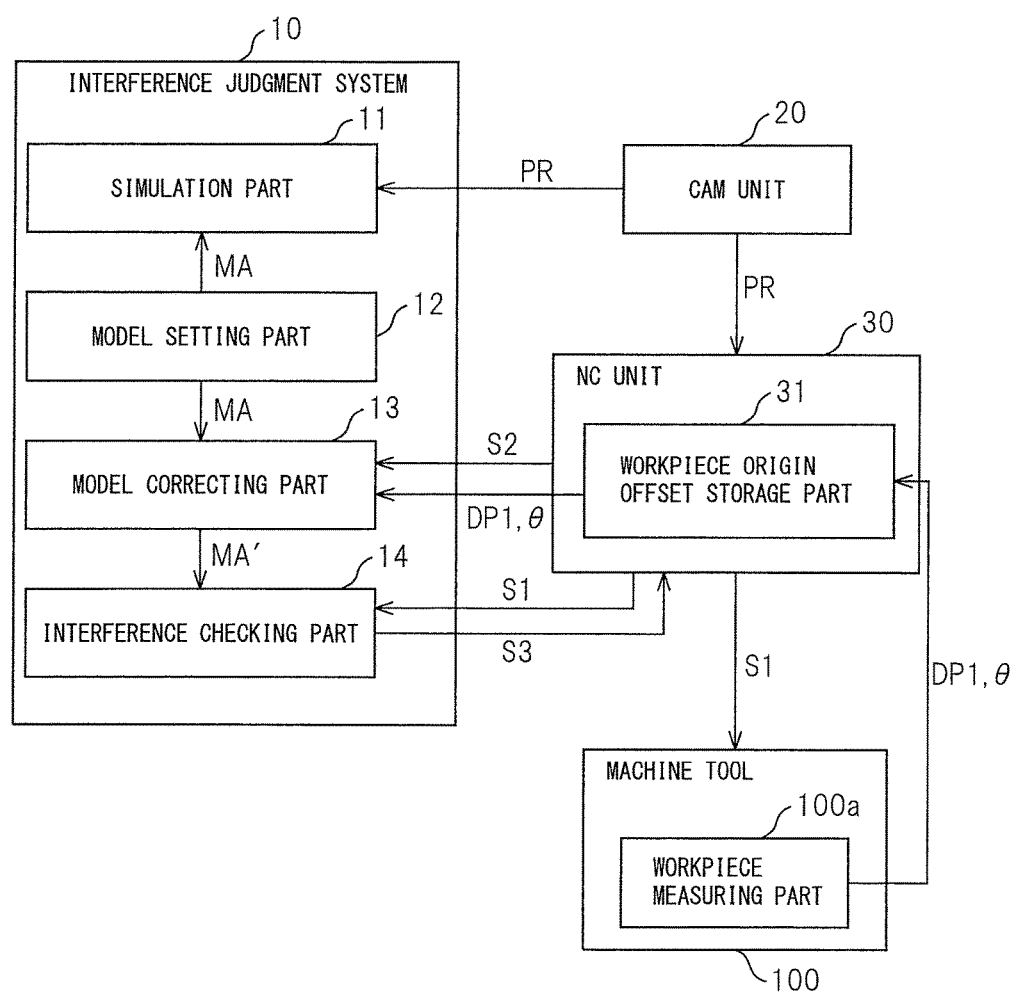
FIG. 2 is a block diagram which shows a general configuration of an interference judgment system of a machine tool according to an embodiment of the present invention.

FIG. 2 is a block diagram which shows the general configuration of an interference judgment system 10 of a machine tool according to the present embodiment. FIG. 2 also shows a CAM unit 20, an NC unit 30, and a machine tool 100 for explaining the functions of the interference judgment system 10. The CAM unit 20 reads CAD data which corresponds to the workpiece shapes from a not shown CAD unit and uses that CAD data to prepare a machining program PR including a tool path. The NC unit 30 reads the machining program PR from the CAM unit 20 and uses the machining program PR as the basis to output a movement command S1 to the drive units (servo motors) of the machine tool 100 to control the operation of the machine tool 100.

The interference judgment system 10 is a computer which is comprised of a processing system which includes a CPU, ROM, RAM, and other peripheral circuits, etc. This interference judgment system 10 has a simulating part 11, model setting part 12, model correcting part 13, and interference checking part 14 as functional components. The interference judgment system 10 is, for example, set near the NC unit 30 or is assembled inside the NC unit 30.

The model setting part 12 sets a machine tool model MA which combines shape models M of the components corresponding to the machine tool 100. The shape models M are models which correspond to the shapes of the components which may interfere with each other during machining of a workpiece, and include a shape model of the workpiece W (workpiece model M1) and a shape model of the mount 5 (mount model M2). Furthermore, the shape models M include shape models of the bottom part of the spindle head 106, the part of the spindle 105 which sticks out from the bottom end face of the spindle head 106, the tool holder 6, tool 1, angle plate 4, the support columns 112 of the carriage 103, the swing support member 114, pallet 2, rotary table 104, etc.

The machine tool model MA is obtained by arranging the shape models M so as to be in predetermined relative positional relationships corresponding to the machine tool 100 (positional relationships in design). The machine tool model MA is a design model which is obtained by design data and is, for example, prepared in a computer lab, etc., at a location separated from the machine tool 100. The model setting part 12 reads this machine tool model MA and stores it in the memory to set the machine tool model MA.

The simulating part 11 reads the shape data of the machine tool model MA from the model setting part 12 and reads the machining program PR from the CAM unit 20. Further, in accordance with the machining program PR, it makes the shape models M in the machine tool model operate, executes a simulation on the computer to judge if the shape models M interfere with each other, and notifies the results of judgment to the operator. If the desired result of simulation of the shape models M not interfering with each other is obtained, the operator measures the position of the workpiece W mounted to a workpiece mounting surface 4 (FIG. 1) of the machine tool 100. Such simulation may be executed in a computer lab. A simulation system which has the function of the simulating part 11 may, for example, be installed in a computer lab together with a CAM unit 20. The simulating part 11 uses a workpiece model M1 as the basis to verify the appropriateness of the tool path.

Figure 3:
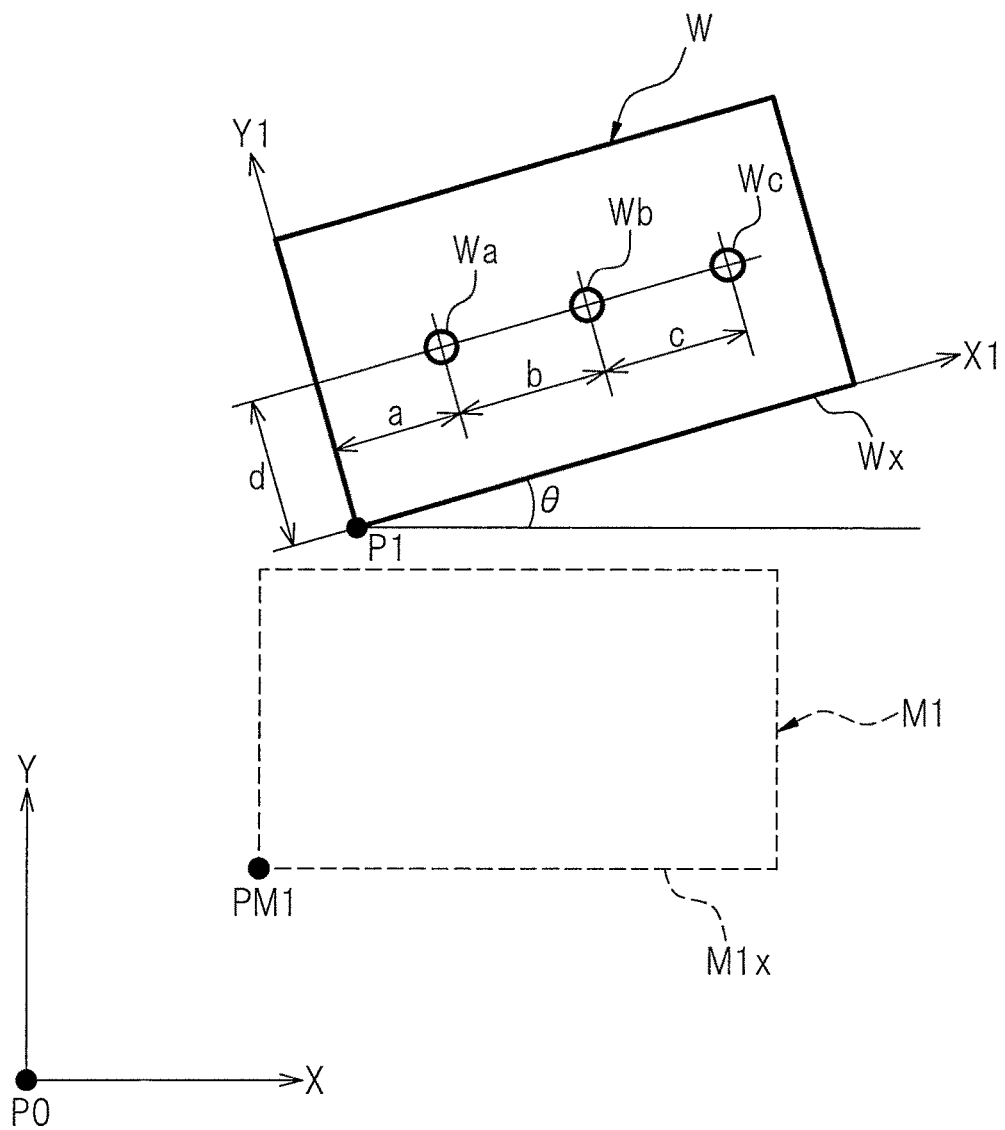
FIG. 3 is a plan view which shows one example of a workpiece which is mounted to a workpiece mounting surface of a machine tool.

FIG. 3 (solid line) is a plan view which shows one example of a workpiece W which is mounted at a workpiece mounting surface 4. The broken line of FIG. 3 shows the workpiece model M1 which corresponds to this workpiece W and which is set by the model setting part 12. The workpiece W is set in advance with a workpiece origin P1 as a reference point. The design values "a" to "d" of the different parts of the workpiece W (for example, the holes Wa, Wb, and Wc) are given by a workpiece coordinate system of three perpendicular axes (X1 axis, Y1 axis, and Z1 axis) based on the workpiece origin P1. One end face of the workpiece W (for example, end face Wx along X1 axis) will be called the "reference surface". On the other hand, the machine tool 100 is set with a coordinate system inherent to the machine and centered on the origin (machine origin P0), which is constituted by a machine coordinate system of three perpendicular axes (X-axis, Y-axis, and Y-axis).

The reference point of a workpiece model M1 (workpiece model origin PM1) is a point which corresponds to the workpiece origin P1, while the coordinate data DPM1 of the workpiece model origin PM1 in the machine coordinate system is obtained by design data. The reference surface M1x of the workpiece model M1 which corresponds to the reference surface Wx of the workpiece W is parallel with the X-axis of the machine coordinate system. As opposed to this, the reference surface of the actual workpiece W is not necessarily parallel with the X-axis. In FIG. 3, it deviates from the X-axis by the angle $\theta$. Therefore, if obtaining a grasp of the amount of deviation of the workpiece coordinate system from the machine coordinate system, i.e., the coordinate data DP1 of the workpiece origin P1 (origin positional deviation amount) and angle $\theta$ of the reference surface Wx (angular deviation amount) in the machine coordinate system, it is possible to identify the workpiece position in the machine coordinate system. Below, the amounts of deviation of the workpiece coordinate system from the machine coordinate system will be called the "workpiece origin offset amounts". The workpiece origin offset amounts includes the origin positional deviation amount DP1 and the angular deviation amount $\theta$. These workpiece origin offset amounts, origin positional deviation amount DP1, and angular deviation amount $\theta$ are parameters which relate to the workpiece coordinate system.

As shown in FIG. 2, the machine tool 100 has a workpiece measuring part 100a which measures the position of a workpiece W which is mounted at a workpiece mounting surface 4, i.e., the workpiece origin offset amounts. The workpiece measuring part 100a can, for example, be configured by a contact type probe which can be mounted at the spindle 105. The workpiece origin offset amounts are measured after mounting the workpiece to the workpiece mounting surface 4 and before machining the workpiece.

When measuring the workpiece origin offset amounts, first, preparations are performed in parallel, i.e., the workpiece W is made to rotate in the C-axial direction together with the rotary table 104 so that the reference surface Wx of the workpiece W (FIG. 3) becomes parallel with the X-axis. The amount of rotation at this time can be calculated from a signal from a rotation detector which detects the amount of rotation of a servo motor. Due to this, an angular deviation $\theta$ is determined. Next, for example, a contact type probe is attached to the spindle 105, then the spindle 105 is made to move relative to the workpiece W to make the tip of the contact type probe contact the two surfaces including the workpiece origin P1. The position of the spindle 105 at this time can be calculated from a signal from a rotation detector which detects the amount of rotation of a servo motor. Due to this, an origin position deviation DP1 is determined.

The above determined origin positional deviation amount DP1 and angular deviation amount $\theta$ are stored as the workpiece origin offset amounts in the workpiece origin offset storage part 31 of the NC unit 30 of FIG. 2. It is also possible to determine the coordinate data DP1 of the workpiece origin P1 in advance, then make the workpiece W turn so that the reference surface Wx becomes parallel to the X-axis and determine the rotation amount $\theta$.

The model correcting part 13 has output to it a positioning signal S2 from the NC unit 30 at a predetermined timing. The positioning signal S2 is, for example, output simultaneously with an operation start command of the machine tool 100. Further, the positioning signal S2 is set in the machining program PR in advance by an M code and is output when the M code is read. When the workpiece origin offset storage part 31 stores the workpiece origin offset amounts DP1 and $\theta$ after measuring the workpiece position, it is also possible to automatically output a positioning command S2. After measuring the workpiece position, a not shown operating panel is operated by the operator so as to output the positioning signal S2. Further, when automatically changing a pallet 2 with an outside pallet stocker (not shown), the positioning signal S2 may be output. At this time, outside preparations are necessary for setting the workpiece origin offset amounts DP1 and $\theta$ in advance.

If a positioning command S2 is output to the model correcting part 13, the model correcting part 13 uses the workpiece origin offset amounts DP1 and $\theta$ as the basis to correct the machine tool model MA. In this case, first, the machine tool model MA set at the model setting part 12 and the workpiece origin offset amounts DP1 and $\theta$ stored at the workpiece origin offset storage part 31 are read. Further, the workpiece model M1 is made to move in parallel by the positional deviation amount between the workpiece origin P1 and the workpiece model origin PM1 (difference between coordinate data DP1 and DPM1) and, further, the workpiece model M1 is made to rotate about the C-axial direction by the angle (−θ). At this time, the workpiece model M1 and mount model M2 are joined together, so the mount model M2 is also made to move in parallel and rotate. Due to this, the data of the machine tool model MA is updated.

The interference checking part 14 reads the corrected machine tool model MA' from the model correcting part 13 and reads the movement command S1 based on the machining program PR from the NC unit 30. The movement command S1 is read before a movement command S1 is output to the machine tool 100. That is, the interference checking part 14 reads the movement command S1 earlier by a predetermined time "t" (for example, several ms). Further, it makes the shape models M of the machine tool model MA' operate in accordance with the movement command S1 to simulate the operation preceded by a predetermined time "t" than the actual operation. Due to this, it judges if there would be any intersecting parts between the individual shape models M, i.e., the presence or absence of interference between components.

If the interference checking part 14 judges that the components interferes with each other, it outputs a stop command S3 to the NC unit 30. If the NC unit 30 receives the stop command S3, it makes the servo motors of the machine tool 100 stop operating. Due to this, the machine tool 100 stops operating and interference between the components can be prevented in advance. If a command for avoiding interference between the components, it is also possible to output another command instead of a stop command S3. For example, it is also possible to output a command which changes the path of movement so as to avoid interference or a command which makes the components move in the opposite direction from the movement command S1.

Figure 4A:
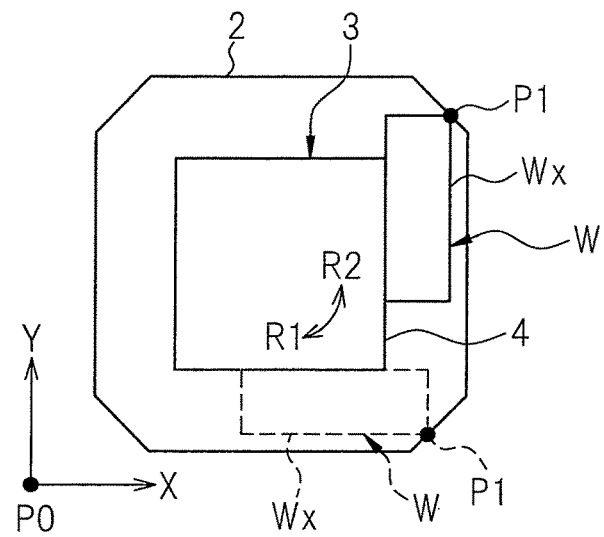
FIG. 4A is a view which explains one example of a measurement step of a workpiece.
Figure 4B:
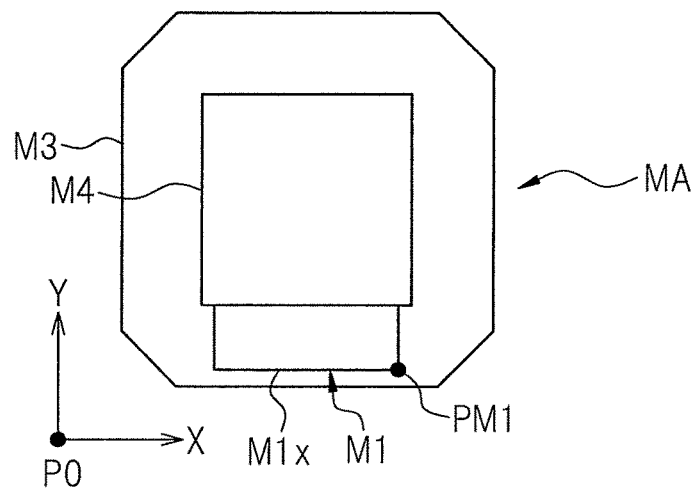
FIG. 4B is a view which shows a workpiece model which corresponds to the workpiece of FIG. 4A.
Figure 4C:
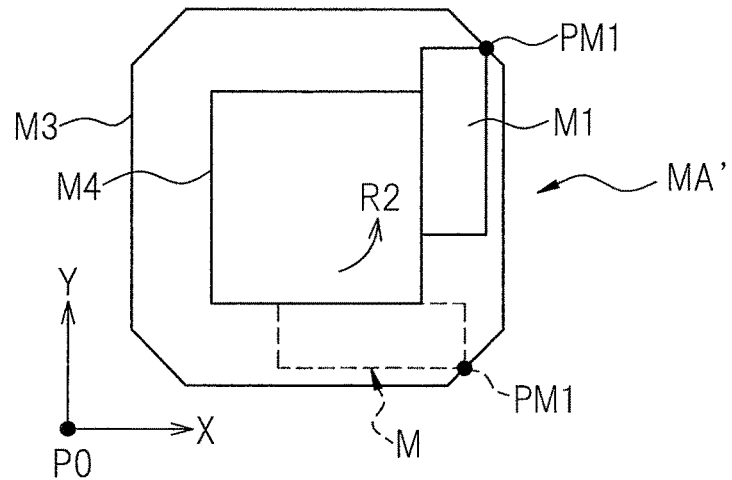
FIG. 4C is a view which explains a correcting step of a workpiece model of FIG. 4B.

The characterizing operation of the interference judgment system 10 according to the present embodiment will be explained more specifically. FIG. 4A is a plan view of a workpiece W which is mounted to a workpiece mounting surface 4 of the angle plate 3, while FIG. 4B and FIG. 4C are plan views which show a workpiece model M1 which corresponds to FIG. 4A. First, FIG. 4A will be used to explain the measurement step of the workpiece origin offset amounts.

In the initial state, the workpiece W is mounted at the solid line position of FIG. 4A. When measuring the workpiece origin offset amounts, first, the pallet 2 is made to rotate in the C-axial direction (arrow R1 direction) and the workpiece W is made to move to the broken line position so that the workpiece reference surface Wx becomes parallel to the X-axis. The rotation amount θ of the pallet at this time (for example,) 90° is stored in the workpiece origin offset storage part 31. Next, a contact type probe is used to measure the position of the workpiece origin P1 (broken line). The coordinate data DP1 of the workpiece origin P1 at this time is stored in the workpiece origin offset storage part 31. Due to this, the workpiece origin offset amounts are obtained.

FIG. 4B shows an initial workpiece model M1 which is set by the model setting part 12. FIG. 4B shows part of the machine tool model MA which includes a model of the pallet 2 (pallet model M3) and a model of the angle plate 3 (angle plate model M4). A reference surface Mx of the workpiece model M1 which is set by the model setting part 12 is parallel to the X-axis. Coordinate data DPM1 of the workpiece model origin PM1 is held as design data by the model setting part 12. The model correcting part 13 reads the coordinate data DP1 of the workpiece origin P1 from the workpiece origin offset storage part 31 and makes the workpiece model M1 move in parallel by the amount of positional deviation between the workpiece model origin PM1 of FIG. 4B and the workpiece origin P1 of the workpiece W (broken line) of FIG. 4A. Due to this, the workpiece model M1 moves to the broken line position of FIG. 4C.

Furthermore, the model correcting part 13 reads the angular deviation amount θ from the workpiece origin offset storage part 31 and makes the workpiece model M1 of the broken line of FIG. 4C rotate in the C-axial direction by the angular deviation amount θ in the opposite direction to θ (R2 direction). Due to this, the workpiece model M1 moves to the solid line position of FIG. 4C. Due to the above correcting step, the machine tool model MA 9 is corrected. The corrected machine tool model MA' matches with the actual machine tool 100. The interference checking part 14 uses the corrected machine tool model MA' to judge the presence or absence of an interference between the components, and therefore it is possible to precisely judge interference.

Figure 5A:
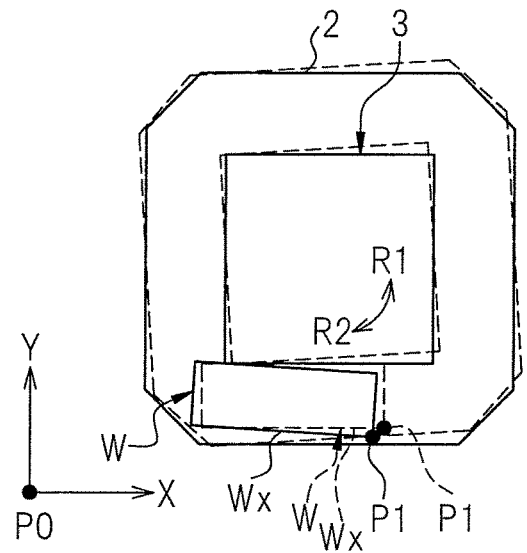
FIG. 5A is a view which explains another example of a measurement step of a workpiece.
Figure 5B:
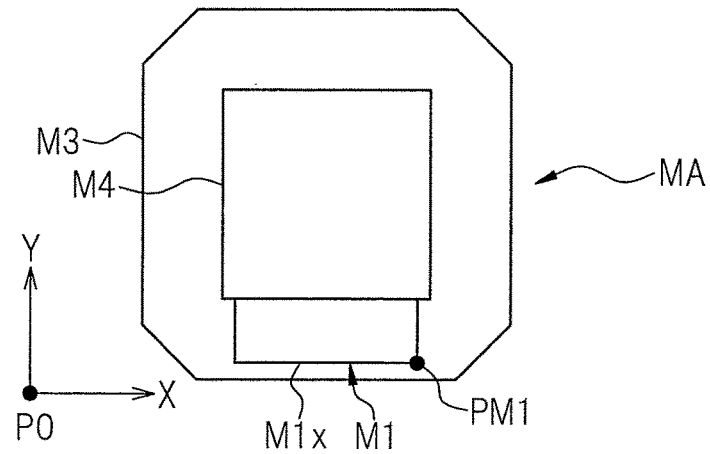
FIG. 5B is a view which shows a workpiece model which corresponds to the workpiece of FIG. 5A.
Figure 5C:
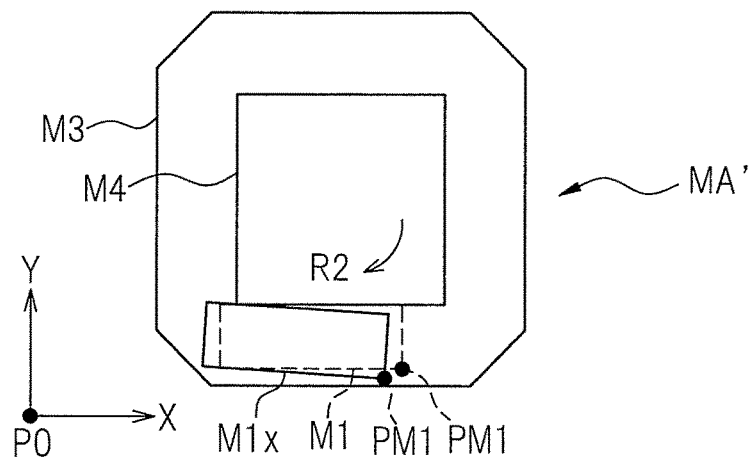
FIG. 5C is a view which explains a correcting step of a workpiece model of FIG. 5B.

FIG. 5A to FIG. 5C will be used to explain another operation. FIG. 5A is a plan view of a workpiece W which is mounted tilted at a workpiece mounting surface 4 of the angle plate 3, while FIG. 5B and FIG. 5C are plan views which show a workpiece model M1 which corresponds to FIG. 5A. In the initial state, the workpiece W is mounted at the solid line position of the figure. When measuring the workpiece origin offset amounts, first, the pallet 2 is made to rotate in the C-axial direction (arrow R1 direction) and the workpiece W is made to move to the broken line position so that the workpiece reference surface Wx becomes parallel to the X-axis. Next, a contact type probe is used to measure the position of the workpiece origin P1 (broken line). Finally, the pallet 2 is made to rotate in the opposite direction of the C-axis (R2 direction) and the workpiece W is returned to its original solid line position. In the above measurement step, the rotation amount θ of the pallet and the coordinate data DP1 of the workpiece origin P1 are stored as workpiece origin offset amounts in the workpiece origin offset storage part 31.

FIG. 5B shows the initial workpiece model M1 which is set at the model setting part 12. This workpiece model is the same as that of FIG. 4B. The model correcting part 13 reads the coordinate data DP1 of the workpiece origin P1 from the workpiece origin offset storage part 31 and makes the workpiece model M1 move in parallel by the positional deviation amount between the workpiece model origin PM1 of FIG. 5B and the workpiece origin P1 of the workpiece W of FIG. 5A (broken line). Due to this, the workpiece model M1 moves to the broken line position of FIG. 5C.

Furthermore, the model correcting part 13 reads the angular deviation amount θ from the workpiece origin offset storage part 31 and makes the workpiece model M1 of the broken line of FIG. 5C rotate in the C-axial direction by the angular deviation amount θ in the opposite direction from θ (R2 direction). Due to this, the workpiece model M1 moves to the solid line position of the FIG. 5C. Due to the above correcting step, the machine tool model MA is corrected. The corrected machine tool model MA' matches the actual machine tool 100. Therefore, it is possible to judge precisely the presence or absence of interference between the components.

Figure 6A:
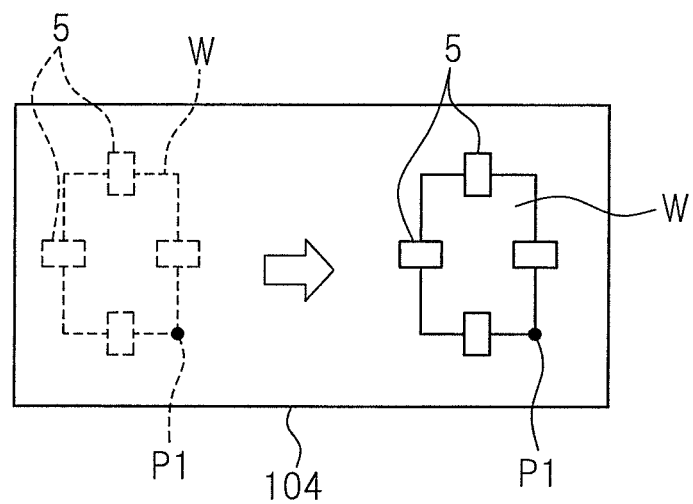
FIG. 6A is a view which shows an example of change of a mounting position of a workpiece.
Figure 6B:
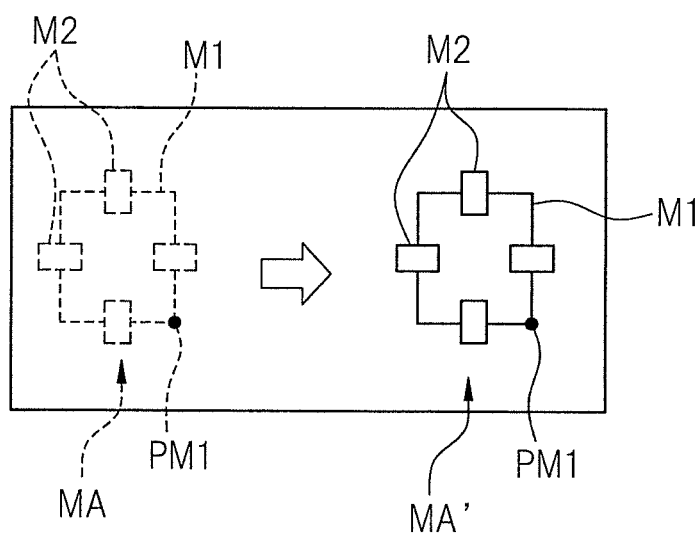
FIG. 6B is a view which shows a workpiece model which corresponds to the workpiece of FIG. 6A and a mount model.

FIG. 6A is a view which shows an example of changing the mounting position of a workpiece W on the rotary table, while FIG. 6B is a view which shows a workpiece model M1 which corresponds to FIG. 6A. In the initial state, as shown by the broken line of FIG. 6A, the workpiece W is mounted to one end side of the rotary table 104 by the mount 5, and corresponding to this, as shown by the broken line of FIG. 6B, the workpiece model M1 and mount model M2 have already been set. When changing the mounting position of the workpiece W from this state to the other end side of the rotary table 104 as shown by the solid line of FIG. 6B, for example, the machine tool model MA is corrected in the following way.

That is, first, the positional deviation amount and the angular deviation amount θ from the workpiece origin P1 of FIG. 6A (broken line) to the workpiece origin P1 (solid line) are measured and are stored as workpiece origin offset amounts in the workpiece origin offset storage part 31. Next, the workpiece model M1 (broken line) of FIG. 6B is made to move in parallel and rotate by the workpiece origin offset amounts. Due to this, a workpiece model M1 of the solid line of FIG. 6B is obtained and the machine tool model MA is corrected.

In this case, it is assumed that the mount 5 moves together with the workpiece W. The mount model M2, like the workpiece model M1, is made to move in parallel and rotate by the workpiece origin offset amounts. That is, the relative positional relationship between the workpiece model M1 and the mount model M2 is deemed constant and the two models M1 and M2 are made to integrally move. For this reason, it is possible to judge the presence of interference with the mount 5 which moves along with movement of the workpiece.

According to the present embodiment, the following actions and effects can be exhibited. (1) As the setting step, a machine tool model MA which combines shape models M of components which move relative to each other (workpieces W, spindle head 106, swing support member 114, etc.) is set, while as the measurement step, the position of a workpiece W which is mounted at a workpiece mounting surface 4 (workpiece origin offset amount) is measured and is stored at the workpiece origin offset storage part 31. Furthermore, as the correcting step, this workpiece origin offset amounts are used as the basis to correct the machine tool model MA which includes the workpiece model M1, while as the judgment step, the corrected machine tool model MA' is used as the basis to judge the presence or absence of interference between the components. Due to this, the machine tool model MA' which is obtained by correcting the machine tool model MA to match the actual workpiece position is used for judgment of the presence or absence of interference, so it is possible to precisely judge the presence or absence of interference between components. Further, there is no need to go to the trouble of inputting the position of the actual workpiece in the interference judgment system 10 so as to judge interference. The workpiece origin offset amounts which are held by the NC unit 30 for machining the workpiece W are utilized to automatically correct the machine tool model MA including the workpiece model M1, so no trouble is required and it is possible to judge the presence or absence of interference quickly.

(2) The coordinates of the workpiece origin P1 in the machine coordinate system are measured to measure the positional deviation between the position of a workpiece W mounted at a workpiece mounting surface 4 (workpiece origin P1) and the workpiece position on the machine tool model MA set in advance at the model setting part 12 (workpiece model origin PM1). Further, the workpiece model M1 set at the setting part 12 is made to move in parallel by the amount of this positional deviation amount. When shifting the previous workpiece model M1 in position in this way to correct the machine tool model MA, the trouble involved in correcting the machine tool model MA becomes the minimum extent. Therefore, there is no need to remake the machine tool model MA from scratch, and correction of the machine tool model MA is easy.

(3) The amount of deviation between the mounting angle of a workpiece W mounted at a workpiece mounting surface 4 and the angle of the workpiece model M1 set at the model setting part 12, i.e., the angular deviation amount θ of the workpiece reference surface Wx from the X-axis, is measured and the workpiece model M1 is made to move by rotating by the amount of that angular deviation amount θ. Due to this, even if the workpiece W is mounted tilted, it is possible to match the workpiece model M1 with the actual position and possible to precisely and efficiently judge the presence or absence of interference.

(4) When correcting the position of the workpiece model M1, the positions of the workpiece model M1 and the workpiece mount M2 are corrected, so it is possible to judge the presence or absence of interference while considering the actual position of the workpiece mount 5 and possible to prevent interference between the workpiece mount 5 and other components.

(5) During operation of the machine tool in accordance with the machining program PR, the interference checking part 14 reads a movement command S1 of the machining program PR before the machine tool 100 and judges if the components interfere with each other, so it is possible to prevent interference between the components in advance. Further, the machine tool 100 is operated while judging for interference, so it is possible to prevent a drop in the work efficiency. That is, if starting operation of the machine tool 100 after the interference checking part 14 finishes all simulations of the presence of interference, a time when the machine tool 100 cannot be operated (loss time) will occur regardless of the workpiece being mounted to the machine tool 100, and a drop in the work efficiency will be invited. On this point, in the present embodiment, the machine tool 100 is operated while judging the presence or absence of interference, so no loss time is caused and work can be performed efficiently. If not giving priority to work efficiency, it is also possible to finish all of the simulations of interference at the interference checking part 14, then start operation of the machine tool 100.

In the above embodiment, the positional deviation amount and the angular deviation amount of the workpiece W are stored as workpiece origin offset amounts in the workpiece origin offset storage part 31, but when mounting the workpiece W in advance so that the workpiece reference surface Wx becomes parallel to the machine coordinate system (for example, X-axis), it is possible to deem there is no angular deviation, measure only the positional deviation amount, and store that in the workpiece origin offset storage part 31. Alternatively, when making the workpiece origin P1 match with the workpiece model origin PM1 to mount the workpiece W, it is possible to deem that there is no positional deviation, measure only the angular deviation amount, and store that in the workpiece origin offset storage part 31. That is, in the present invention, "measure the workpiece W" includes not only the case of measuring both the positional deviation amount and the angular deviation amount, but also the case of measuring only one of them. It is also possible to measure not only the position of the workpiece W, but also the position of the mount 5 and correct the position of the mount model M2 in accordance with the result of measurement. The machine tool 100 is provided with the workpiece measuring part 100a, but the workpiece measuring part may also be provided separate from the machine tool 100.

In the above embodiment, as the machine tool 100, a five-axis machining center is used, but the present invention can be similarly applied to other machine tools as well. The workpiece W is mounted to the workpiece mounting surface 4 of the angle plate 3, but the workpiece mounting part is not limited to this configuration. So long as setting a machine tool model MA which is obtained by combining shape models M of components including the workpiece model M1, the setting part constituted by the model setting part 12 can be configured in any way. A workpiece origin offset storage part 31 inside the NC unit 30 is used to store the positions of the workpiece W measured in advance, but the storage part may also be provided outside the NC unit 30 (for example, interference judgment system 10). The workpiece position (workpiece origin offset amounts) which is stored in the workpiece origin offset storage part 31 is used as the basis to make the workpiece model M1 move in parallel or rotate so as to correct the machine tool model MA, but the correcting part constituted by the model correcting part 13 is not limited to this configuration. If using the corrected machine tool model MA' as the basis to judge the presence or absence of interference between the components, the judgment part constituted by the judgment checking part 14 can be configured in any way.

According to the present invention, a workpiece position which is measured in advance is used as the basis to correct a machine tool model so as to judge a presence or absence of interference between components, so it is possible to precisely judge the presence or absence of interference between the components.

REFERENCE SIGNS LIST 4 workpiece mounting surface
5 mount
10 interference judgment system
12 model setting part
13 model correcting part
14 interference checking part
31 workpiece origin offset storage part
100 machine tool
100a workpiece measuring part
M shape model
M1 workpiece model
M2 mount model
MA, MA' machine tool model
W workpiece

The invention claimed is:

1. An interference judgment method of a machine tool for judging a presence or absence of an interference between components of a machine tool when operating the machine tool according to a machining program, comprising: a setting step of setting a machine tool model obtained by combining shape models of the components, the machine tool model including a workpiece model corresponding to a workpiece; a measurement step of measuring the workpiece mounted to a workpiece mounting part to determine a parameter relating to a workpiece coordinate system of the workpiece mounted to the workpiece mounting part, and comparing the determined parameter of the mounted workpiece to a parameter relating to the workpiece coordinate system of the workpiece in the machine tool model set at the setting step to determine a deviation between the determined parameter of the mounted workpiece and the parameter of the workpiece in the machine tool model; a correcting step of reading the deviation determined at the measurement step at a predetermined timing and moving the workpiece model set at the setting up step by translation or rotation with an amount corresponding to the deviation to correct the machine tool model set at the setting step; and a judgment step of judging the presence or absence of the interference between the components based on the machine tool model corrected at the correcting step and, when judging that the components interfere, operating the machine tool so as to avoid that interference.

2. The interference judgment method of a machine tool claim 1, wherein
the correcting step includes reading the parameter relating to the workpiece coordinate system, at the same time as starting up the machining program, when reading a predetermined M code in the machining program, when the measurement step of determining the parameter relating to the workpiece coordinate system is finished, when exchanging a pallet, or when a switch on a control panel is turned on.

3. The interference judgment method of a machine tool of claim 1, wherein
the machine tool model includes a mount model corresponding to a mount for fastening the workpiece, and
the correcting step includes keeping the positional relationship between the workpiece model and the mount model constant while correcting positions of the workpiece model and the mount model.

4. The interference judgment method of a machine tool of claim 1, wherein
the judgment step includes reading the machining program in advance during operation of the machine tool in accordance with the machining program to judge if the components interfere and, when judging that the components interfere, operating the machine tool so as to avoid that interference.

5. An interference judgment system of a machine tool for judging a presence or absence of an interference between components of a machine tool when operating the machine tool according to a machining program, comprising: a setting part setting a machine tool model obtained by combining shape models of the components, the machine tool model including a workpiece model corresponding to a workpiece; a measuring part measuring the workpiece mounted to a workpiece mounting part to determine a parameter relating to a workpiece coordinate system of the workpiece mounted to the workpiece mounting part, and comparing the determined parameter of the mounted workpiece to a parameter relating to the workpiece coordinate system of the workpiece in the machine tool model set by the setting part to determine a deviation between the determined parameter of the mounted workpiece and the parameter of the workpiece in the machine tool model; a correcting part reading the deviation determined by the measuring part at a predetermined timing and moving the workpiece model set by the setting part by translation or rotation with an amount corresponding to the deviation to correct the machine tool model set at the setting part; and a judgment part judging the presence or absence of the interference between the components based on the machine tool model corrected at the correcting part and, when judging that the components interfere, operating the machine tool so as to avoid that interference.

* * * * *